United States Patent
Beyer

(10) Patent No.: US 6,454,533 B2
(45) Date of Patent: *Sep. 24, 2002

(54) HOLLOW BLADE FOR HYDRAULIC TURBINE OR PUMP

(75) Inventor: James R. Beyer, York, PA (US)

(73) Assignee: Voith Siemens Hydro Power Generation Inc., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/730,365

(22) Filed: Dec. 5, 2000

Related U.S. Application Data

(63) Continuation of application No. 09/082,024, filed on May 20, 1998, now Pat. No. 6,155,783.

(51) Int. Cl.$^7$ ............... F01D 5/14; F01D 5/18
(52) U.S. Cl. ............... 416/90 R; 416/186 R; 416/188; 416/189; 416/231 R; 416/232; 416/233; 29/469.5; 29/889.7; 29/889.72
(58) Field of Search ............... 416/90 R, 90 A, 416/186 R, 188, 213 R, 189, 213 A, 224, 229 R, 229 A, 231 R, 232, 233; 29/889.7, 889.72, 469.5

(56) References Cited

U.S. PATENT DOCUMENTS

| | | |
|---|---|---|
| 1,579,355 A | 4/1926 | Greenawalt |
| 1,925,777 A | 9/1933 | Sperling |
| 1,942,995 A | 1/1934 | Biggs |
| 2,668,079 A | 2/1954 | Menegus et al. |
| 2,772,863 A | 12/1956 | Harney et al. |
| 2,803,428 A | 8/1957 | Garnett |
| 2,914,301 A | 11/1959 | Hess |
| 3,108,146 A | 10/1963 | Gross |
| 3,123,651 A | 3/1964 | Gross et al. |
| 3,132,839 A | 5/1964 | Haekal |
| 3,305,215 A | 2/1967 | Swiecicki et al. |
| 3,576,065 A | 4/1971 | Frazier |
| 3,628,226 A | 12/1971 | Nelson |
| 3,695,778 A | 10/1972 | Taylor |
| 3,736,638 A | 6/1973 | Stone, Jr. |
| 3,810,286 A | 5/1974 | Kaufman, Sr. |
| 3,862,747 A | 1/1975 | Richter |
| 4,043,498 A | 8/1977 | Conn, Jr. |
| 4,169,047 A | 9/1979 | Wilson |
| 4,188,287 A | 2/1980 | Faulkner et al. |
| 4,371,480 A | 2/1983 | Vos |
| 4,479,757 A | 10/1984 | Holmes et al. |
| 4,780,051 A | 10/1988 | Fisher, Jr. |
| 5,879,130 A | 3/1999 | Beyer et al. |
| 5,896,657 A | 4/1999 | Beyer et al. |
| 5,924,842 A | 7/1999 | Beyer et al. |
| 6,155,783 A | 12/2000 | Beyer |

FOREIGN PATENT DOCUMENTS

| | | |
|---|---|---|
| FR | 2071402 | 9/1971 |
| GB | 760734 | 11/1956 |
| SE | 117479 | 10/1946 |

*Primary Examiner*—Christopher Verdier
(74) *Attorney, Agent, or Firm*—Foley & Lardner

(57) ABSTRACT

A runner for a hydraulic turbine or pump includes a hub and a plurality of blades extending from the hub at spaced intervals therearound. Each blade includes an inner edge secured to the hub and a distal outer edge, a leading edge and an opposed trailing edge, and a curved suction surface and an opposed curved pressure surface. At least one of the blades is fabricated from a curved pressure-side member and a curved suction-side member secured together. The pressure-side member includes at least a substantial portion of the curved pressure surface and an opposed first inner surface. The suction-side member includes at least a substantial portion of the curved suction surface and an opposed second inner surface. The first and second inner surfaces face each other, and at least a portion of the first inner surface is spaced from at least a portion of the second inner surface to form a cavity within the blade. A method of making the hollow blade is also disclosed.

20 Claims, 4 Drawing Sheets

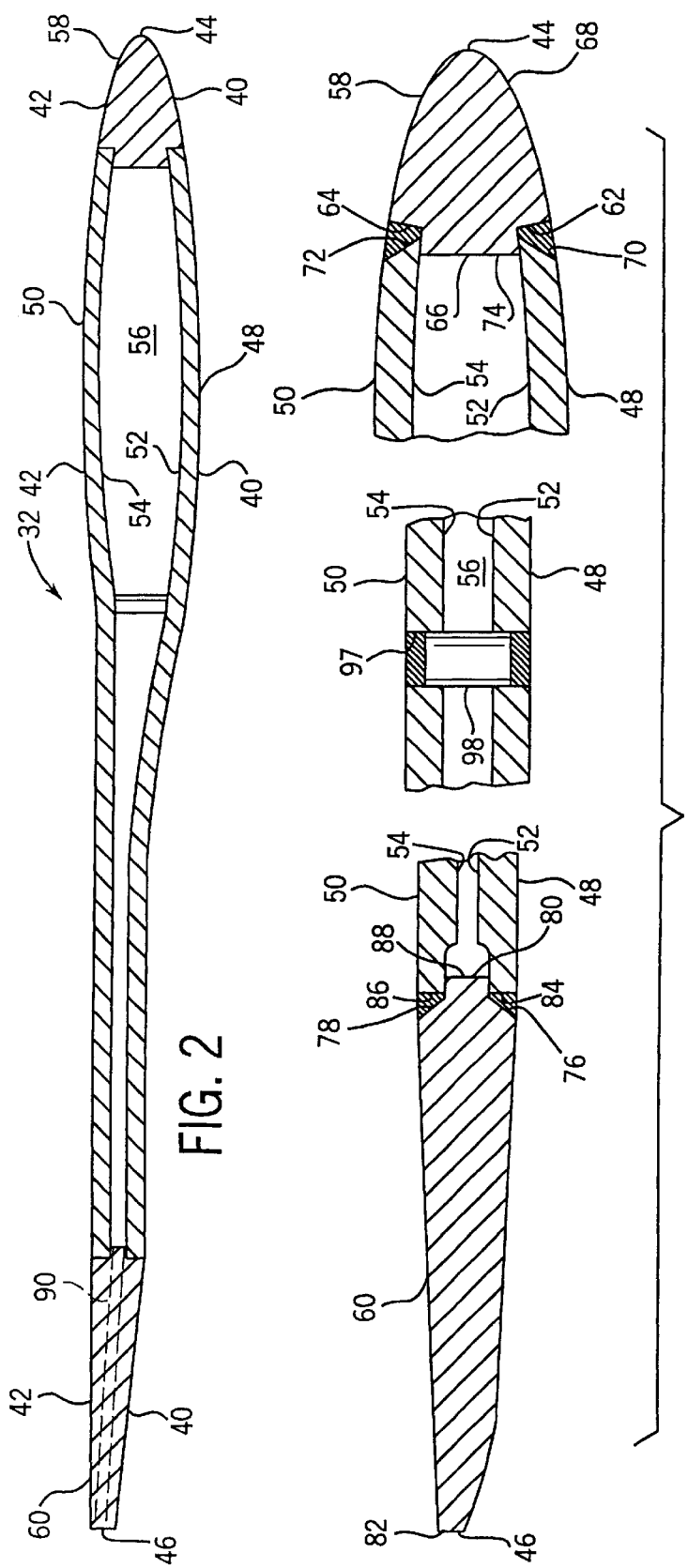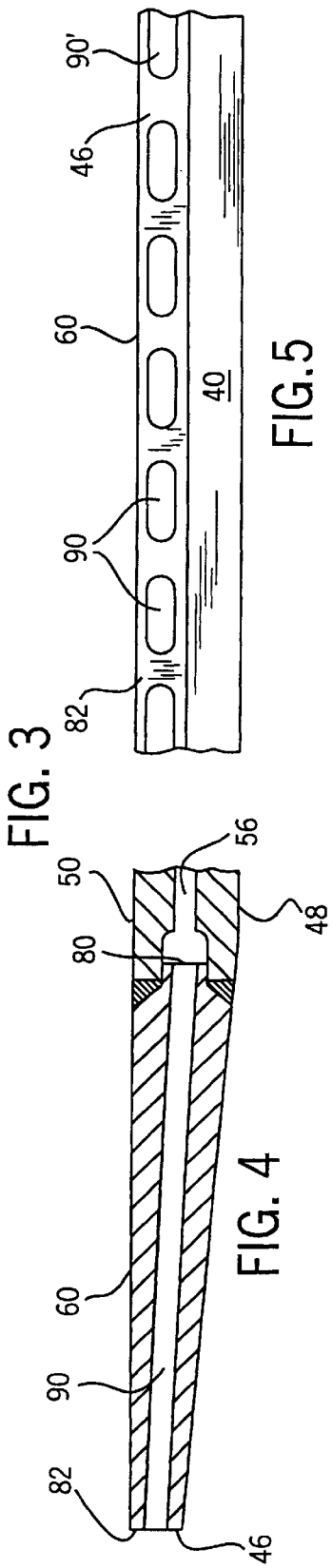

HOLLOW BLADE FOR HYDRAULIC TURBINE OR PUMP

RELATED APPLICATIONS

This application is a continuation of U.S. patent application Ser. No. 09/082,024, filed May 20, 1998, now U.S. Pat. No. 6,155,783.

FIELD OF THE INVENTION

The present invention relates generally to hydroelectric turbine or pump installations. More particularly, the invention pertains to hydroelectric installations provided with hollow blades.

BACKGROUND OF THE INVENTION

Runner blade construction consists of either a solid casting or a fabrication. Most Francis runner blades built in the 70's and 80's were solid cast with extra material added in critical areas for final finishing. These castings were, and often still are, hand ground to templates and fixtures to meet the desired shapes. As machine tools have improved and the runner blade designs have become more computerized, critical areas and features of more complex geometries, such as integral passages, can nowadays be machined into the cast blades. However, this more modern machining approach has done little to improve the manufacturing cycle time, due to the long lead time associated with cast components, nor has it materially reduced manufacturing costs. Although fabricated blades offer improved cycle time and cost advantages, it has proven difficult in practice to fabricate blades having complex geometric features such as integral gas channels, particularly in the thinner portions of the blade.

The ability to construct runner blades with integral passages provides an opportunity to address environmental concerns over the water quality releases from hydroelectric facilities. Hydraulic turbines draw their discharges from the lower level of the upstream reservoir. During the summer months, thermal stratification of the reservoir produces a surface layer of less dense, warm water with relatively high dissolved oxygen and a lower, relatively cold oxygen-depleted layer resulting from the decay of organic material on the reservoir bottom. Thus, turbine discharges during the summer months are often low in dissolved oxygen (DO), which can contribute to water quality problems downstream of the facility.

Relicensing and rehabilitation of an existing hydroelectric facility offers an opportunity to address these concerns over dissolved oxygen levels and other water quality regulations which affect hydropower releases. Rehabilitating an existing hydroelectric facility may include replacement of the runner. Replacing an existing runner with a new runner having integral passages, and providing air through existing structures or new structures of the installation to the integral passages, enhances dissolved oxygen levels in the discharges without material losses in efficiency or substantial increases in cost of rehabilitation.

One effort to construct turbine runners having fabricated blades with integral passages for increasing the level of dissolved oxygen is disclosed in co-pending U.S. patent application Ser. No. 08/733,366, filed Oct. 17, 1996, now U.S. Pat. No. 5,924,842, issued Jul. 20, 1999, to the same assignee. In that application, the gas passage is integrally formed in the blade between a leading blade portion and a trailing blade portion. More precisely, a rearwardly facing slot in the leading blade portion cooperates with a forwardly facing slot in the trailing blade portion to form the integral gas passage when the portions are joined. The trailing blade portion also includes a plurality of gas discharge passages extending from the integral gas passage to the trailing edge of the blade.

The ability to fabricate runner blades with integral passages or cavities offers other advantages besides the opportunity to address the water quality of hydroturbine releases. Most importantly, a hollow blade is lighter and saves material costs. The lighter weight of the blades can also improve turbine efficiency. In addition, the hollow blade can be manufactured thicker, which in some cases can also enhance turbine performance and may be better for fish.

The foregoing therefore indicates there is a need for a method of forming a runner blade having gas channels or cavities of relatively complex geometry which offers improved cycle time and is less expensive than the prior art methods.

SUMMARY OF THE INVENTION

The present invention includes a method of making a hollow blade for a hydraulic turbine or pump. The blade includes an inner edge and an opposed outer edge, a leading edge and an opposed trailing edge, and a curved suction surface and an opposed curved pressure surface. The method of making the blade includes the steps of shaping a first generally flat plate into a curved pressure-side member and shaping a second generally flat plate into a curved suction-side member. The pressure-side member includes at least a substantial portion of the curved pressure surface and an opposed first inner surface. The suction-side member includes at least a substantial portion of the curved suction surface and an opposed second inner surface. The method further includes the step of fixedly securing the pressure-side and suction-side members together. When the members are secured together, the first and second inner surfaces face each other, and at least a portion of the first inner surface is spaced from at least a portion of the second inner surface to form a cavity within the blade.

The present invention further includes a runner for a hydraulic turbine or pump. The runner includes a hub and a plurality of blades extending from the hub at spaced intervals therearound. Each blade has an inner edge secured to the hub and a distal outer edge. Each blade also has a leading edge and an opposed trailing edge, and a pressure side and an opposed suction side. At least one of the blades further comprises a curved pressure-side member and a curved suction side member secured together. The pressure-side member includes at least a substantial portion of the curved pressure surface and an opposed first inner surface. The suction-side member includes at least a substantial portion of the curved suction surface and an opposed second inner surface. The first and second inner surfaces face each other, and at least a portion of the first inner surface is spaced from at least a portion of the second inner surface to form a cavity within the blade.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 2 is a cross-sectional view of the blade of FIG. 1, taken along the line 2—2 in FIG. 1;

FIG. 3 is an enlarged cross-sectional view of a leading edge portion, a mid portion, and a trailing edge portion of the blade of FIG. 1, taken along line 3—3 in FIG. 1;

FIG. 4 is an enlarged cross-sectional view of a trailing edge portion of the blade of FIG. 1, taken along line 4—4 of FIG. 1;

FIG. 5 is an end view of discharge passages located along a trailing edge portion of the blade of FIG. 1, taken along line 5—5 in FIG. 1;

DETAILED DESCRIPTION OF A PREFERRED EXEMPLARY EMBODIMENT

The present invention relates generally to hydroelectric installations having turbines or pumps provided with hollow blades. The hollow turbine blades may be designed to enhance the level of dissolved gas, such as oxygen, in water flowing through the turbines.

Figure 1:
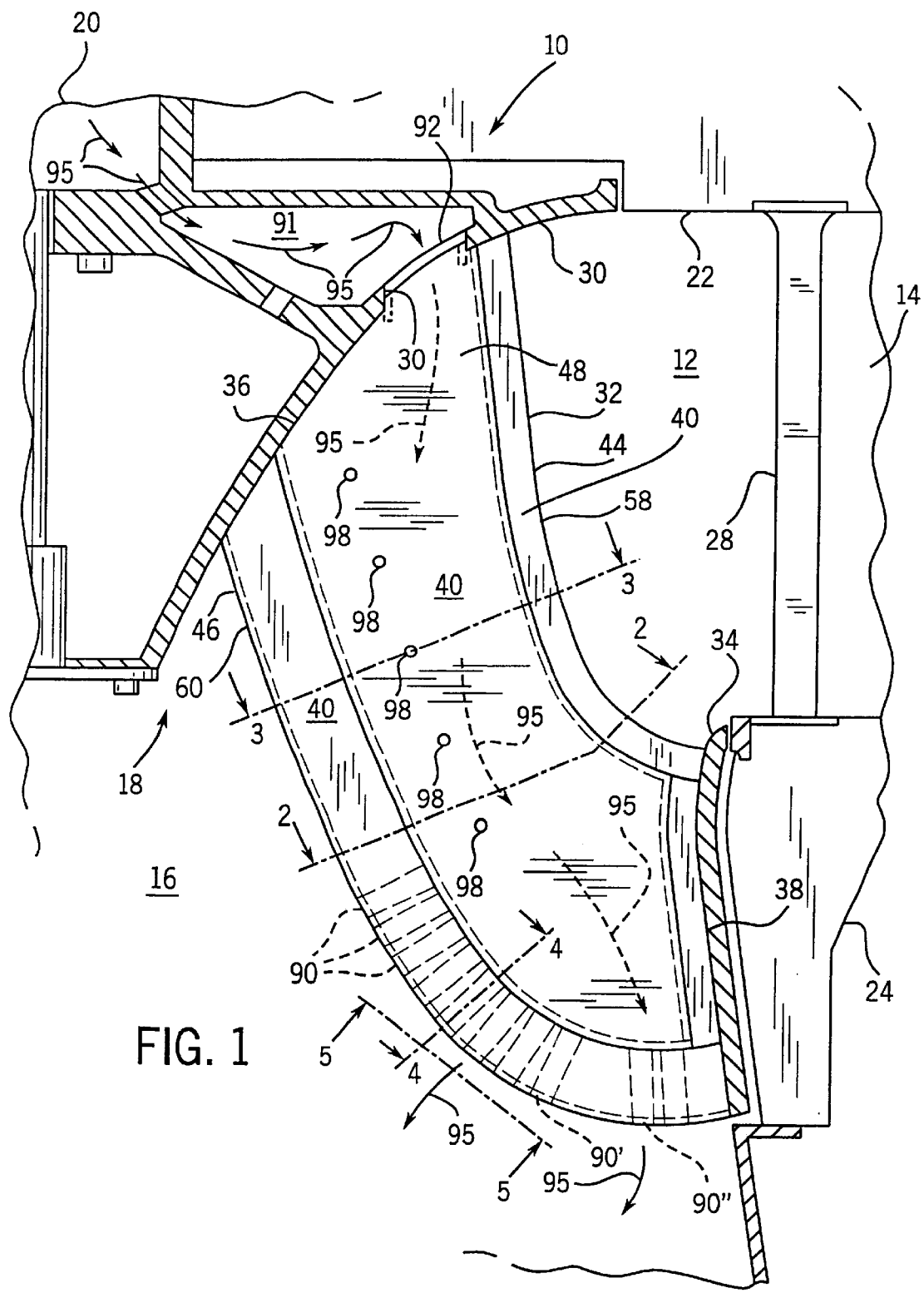
FIG. 1 is an elevational view, partially in cross section, of a Francis turbine including a first embodiment of a runner of the present invention.

Referring initially to FIG. 1, a portion of a hydroelectric turbine installation generally designated as 10 comprises a passageway 12, in which water flows from a source 14 in fluid communication with an upstream reservoir, to a lower elevation discharge region 16. As illustrated, installation 10 is a Francis turbine having a runner 18 secured to a shaft 20 supported for rotation therewith, a stationary head cover 22 and a bottom discharge ring 24. Installation 10 also includes a plurality of pivotally adjustable wicket gates 28 to regulate the flow of water impinging on turbine runner 18.

Turbine runner 18 includes a crown (or hub) 30 secured to the lower end of shaft 20 and a plurality of circumferentially spaced runner blades 32. Each runner blade 32 extends from crown 30 and terminates at an enclosing band 34 substantially concentric with crown 30. Each blade 32 is fixedly secured to crown 30 along an inner edge 36 of blade 32, and to band 34 along a distal outer edge 38. Each blade 32 has a water directing surface defined by a curved pressure surface 40, an oppositely facing curved suction surface 42, a leading edge 44 and a spaced apart trailing edge 46. As persons skilled in the art will understand from viewing FIG. 1, the water directing surface defined by curved pressure and suction surfaces 40 and 42 has a pitch (or angle of attack) relative to the water flow that varies between the inner and outer edges 36 and 38 of blade 32, i.e., blade 32 is "twisted."

As best shown in FIG. 2, blade 32 comprises a curved pressure-side member 48 and a curved suction-side member 50 secured in a fixed relationship. Pressure-side member 48 includes at least a substantial portion of curved, twisted pressure surface 40 and an opposed inner surface 52. Suction-side member 50 includes at least a substantial portion of curved, twisted suction surface 42 and an opposed inner surface 54. The "substantial portion" of curved pressure surface 40 provided by pressure-side member 48 is hereby defined to comprise at least about one-fourth of surface 40, preferably at least about one-half of surface 40, and most preferably about three-fourths of surface 40; alternatively, it may comprise the entirety of surface 40. The "substantial portion" of curved suction surface 42 is similarly defined. Inner surfaces 52 and 54 face each other with at least a portion of inner surface 52 spaced from a corresponding portion of inner surface 54 to form a cavity 56 within blade 32.

As best shown in FIG. 3, blade 32 may further include a leading edge member (or portion) 58 and a trailing edge member (or portion) 60. Leading edge member 58 has a pressure-side rear edge 62 and an opposed suction-side rear edge 64, and a rear face 66 and an opposed front face 68. Front face 68 of leading edge member 58 is generally rounded and includes leading edge 44 of blade 32. A front edge 70 of pressure-side member 48 is secured to pressure-side rear edge 62 of leading edge member 58. Similarly, a front edge 72 of suction-side member 50 is secured to suction-side rear edge 64 of leading edge member 58. Preferably, pressure-side and suction-side rear edges 62 and 64 are notched to provide leading edge member 58 with a rearwardly extending projection 74 on which rear face 66 is located. When the various members 48, 50, 58, 60 of blade 32 are secured together, projection 74 preferably extends rearwardly between inner surfaces 52 and 54 of respective pressure-side and suction-side members 48 and 50 to improve the strength of blade 32.

Trailing edge member 60 has a pressure-side front edge 76 and an opposed suction-side front edge 78, and a front face 80 and an opposed rear face 82. Trailing edge member 60 preferably has a thickness distribution generally decreasing from front face 80 toward rear face 82, which rear face 82 defines trailing edge 46 of blade 32. A rear edge 84 of pressure-side member 48 is secured to pressure-side front edge 76 of trailing edge member 60. Similarly, a rear edge 86 of suction-side member 50 is secured to suction-side front edge 78 of trailing edge member 60. Preferably, pressure-side and suction-side front edges 76 and 78 are notched to provide trailing edge member 60 with a forwardly extending projection 88 on which front face 80 is located. When the various members 48, 50, 58, 60 of blade 32 are secured together, projection 88 preferably extends forwardly between inner surfaces 52 and 54 of respective pressure-side and suction-side members 48 and 50 to improve the strength of blade 32.

Turning now to FIGS. 4 and 5, blade 32 is shown with features designed to provide aeration. In particular, trailing edge member 60 is provided with a plurality of gas discharge passages 90 fluidly coupled with cavity 56, and cavity 56 is in fluid communication with an oxygen containing gas source such as air. One manner of fluidly coupling cavity 56 with the gas source is shown in FIG. 1. In FIG. 1, blade 32 includes a gas supply opening 92 along its inner edge 36, and opening 92 is aligned with an opening in crown 30. Crown 30 includes a cavity 91 fluidly coupled to the gas source through shaft 20. During turbine operation, the water pressure adjacent trailing edge 46 is typically low enough that air at atmospheric pressure is drawn through crown 30 and blade 32 as indicated by arrows 95. Of course, a blower or compressor may be used to force the gas if additional aeration is desired or the pressure adjacent trailing edge 46 is too high.

Referring now to FIGS. 1, 4 and 5, discharge passages 90 are generally provided at regularly spaced intervals, however, an extra wide interval may be provided between adjacent passages (such as between passages 90' and 90"). This extra spacing reinforces trailing edge member 60 in regions thereof subject to particular pressure during the pressing operation described below.

Figure 6:
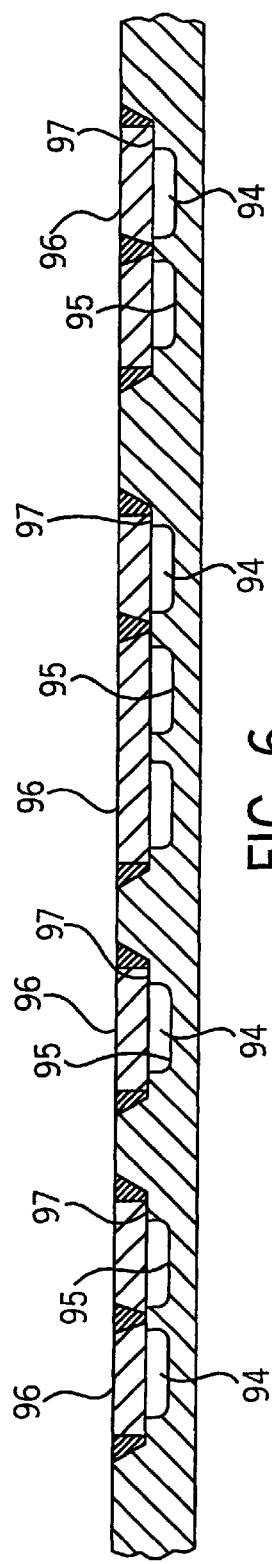
FIG. 6 is a view similar to FIG. 5, but showing an alternative embodiment of a runner blade constructed in accordance with the present invention.

Discharge passages 90 may be formed by drilling holes through trailing edge member 60 from front face 80 to rear face 82, in which case each passage 90 will be circular in cross-sectional shape. Alternatively, passages 90 may be formed by some method other than drilling, such as by an Electrostatic Discharge Machine (EDM), in which case each passage 90 can be of any desired cross-sectional shape (as explained below). FIG. 6 shows yet another alternative construction for discharge passages 94. In particular, passages 94 are formed by grooves and surrounding depressions provided in one or both of pressure surface 40 and suction surface 42, and cover plates 96 are secured in the depressions overlying the grooves.

It will be recognized by those skilled in the art that although blade 32 is preferably formed primarily from four plates of metal, more or fewer plates could be used. In addition, although trailing edge member 60 is shown as one continuous segment extending all the way from inner edge 36 to outer edge 38 of blade 32, it could be spaced from either or both of inner edge 36 and outer edge 38. Moreover, trailing edge member 60 could be one of a number of shorter, adjacent or spaced apart trailing edge members. Even more, trailing edge member 60 could be exposed (i.e., visible) along only one of or neither of pressure surface 40 and suction surface 42. That is, it could be exposed only along one of its sides and rear face 82, or only along rear face 82 (i.e., sandwiched between pressure-side and suction-side members 48, 50). Similar alternative constructions are of course possible for leading edge member 58.

As best shown in FIG. 3, blade 32 may if desired be further reinforced by one or more vibration dampeners 98 located in cavity 56. More specifically, a plurality of plugs 98 may be provided extending through cavity 56 between the spaced apart inner surfaces 52, 54 of respective pressure-side and suction-side members 48, 50. Plugs 98 function to stiffen the pressure-side and suction-side members 48, 50 and prevent vibration relative to each other. In the illustrated embodiment, plugs 98 are provided only in the relatively flat upper part of blade 32. That is, the curved lower portion of blade 32 is already relatively stiff and vibration free because of the three-dimensional characteristics.

A preferred method of forming blade 32 of runner 18 will now be described. Pressure-side and suction-side members 48 and 50 are each preferably made starting from a flat mill plate of substantially uniform thickness. The mill plates are cut to the general profile shapes (i.e., length and width) desired for the pressure-side and suction-side members 48, 50 by a suitable method (e.g., by plasma arc). Suitable mill plate includes stainless steel plate such as ASTM A240 Type 304L or ASTM A240 Type S41500, but other materials will be suitable as known to those skilled in the art.

The pressure-side plate of the desired profile shape is then uniformly heated to preferably between 1850° F. and 1945° F. and pressed between male and female former halves in a hydraulic press (not shown) to the final, curved hydrofoil shape of pressure-side member 48. The suction-side plate of the desired profile shape is similarly formed, but using former halves configured to provide the complementary curvature desired for the suction side, into the curved hydrofoil shape of suction-side member 50. Those skilled in the art will appreciate that the pressing operations could be done at other temperatures or even without heating the plates, depending on the composition, sizes, and shapes of the materials being formed.

Curved pressure-side and suction-side members 48 and 50 are then cooled in the formers under pressure to assure consistency. If desired, members 48 and 50 may subsequently be tempered to impart toughness and ductility, as required by the material of choice.

Turning now to leading edge member 58, it also is preferably made starting from a flat mill plate of substantially uniform thickness. The mill plate is first cut by a suitable method to a desired length and width, and then it is milled to have the desired rounded front face 68. In addition, pressure-side and suction-side rear edges 62 and 64 are notched (again by milling) to thereby form rearwardly extending projection 74. The milled leading edge plate is then heated and bent to the final curved shape of leading edge member 58 as described above for the pressure-side and suction-side plates.

Referring next to trailing edge member 60, it also is preferably made starting from a flat mill plate of substantially uniform thickness. The mill plate is first cut by a suitable method to a desired length and width, and then it is machined (e.g., by face milling on a CNC horizontal boring mill) to establish a thickness distribution generally decreasing from its front face 80 to its rear face 82. In addition, pressure-side and suction-side front edges 76 and 78 are notched (again by milling) to thereby form forwardly extending projection 88.

If aeration is desired, passages 90 may be formed in trailing edge plate extending from front face 80 to rear face 82, preferably extending through projection 88. Passages 90 may be formed by drilling or, alternatively, by use of an Electrostatic Discharge Machine (EDM). When an EDM is used, passages 90 may have a wide range of cross-sectional shapes. For example, possible cross-sectional shapes include squares, rectangles, circles, ovals, stars, hexagons, etc., as limited only by the capability of the machine used and the skill of the operator. Moreover, each discharge passage 90 may be decreasing and/or increasing in size (or constant) over its length; again limited only by the skill of the operator and the machine used. Yet another method of forming gas discharge passages 94 is by milling groves and surrounding depressions along one or both of pressure surface 40 and suction surface 42, and by then securing cover plates 96 in the depressions overlying the grooves. The machined trailing edge plate is then heated and bent to the final curved shape of trailing edge member 60 as described above for the pressure-side and suction-side plates.

The steps of assembling the various members 48, 50, 58, 60 to form the finished blade 32 shown in FIG. 1 will now be described. Although a particular order of assembly is set forth in describing the method, the sequence chosen is of course for illustration purposes only. First, the leading edge member 58 is aligned in a clamping fixture (not shown). Suction-side member 50 is then slid into the fixture underneath leading edge member 58. More specifically, front edge 72 of member 50 is slid underneath projection 74 and into the notch formed along suction-side rear edge 64 of member 58. Next, trailing edge member 60 is laid into the fixture and positioned so that projection 88 extends over inner surface 54 of suction-side member 50, and rear edge 86 of member 50 extends into the notch formed along suction-side front edge 78 of member 60.

At this point, the suction side of blade 32 is built, and the various members 50, 58, 60 of the suction side are tacked together by welding. Next, pressure-side member 48 is laid over the assembled suction side to complete the overall shape of blade 32, and the blade members 48, 50, 58, 60 are then fixedly secured together by additional welding. In this state, inner surfaces 52, 54 of respective pressure-side and suction-side members 48, 50 are facing each other. In addition, inner surfaces 52 and 54 are spaced apart from each other to define cavity 56 therebetween.

Next, the nearly completed blade 32 is placed into a different fixture (not shown) in front of a machine tool (such as a five-axis milling machine). During this stage, the crown and band intersections are formed along with the fit-ups to those mating surfaces. If desired, holes 97 may be drilled straight through the pressure-side and suction-side members 48 and 50, and plugs 98 may then be inserted into holes 97 and welded into place to stiffen members 48 and 50 (see FIG. 3). Any portions of holes 97 not filed by plugs 98 may be filled by weld build-up to provide blade 32 with smooth pressure and suction surfaces 40 and 42.

Although the present invention is discussed above with reference to a Francis turbine, the present invention is not limited to application with any particular type of turbine unit. Runners with hollow turbine blades constructed in accordance with the present invention may be employed in Kaplan turbines, bulb-type turbines, mixed flow machines or propeller turbines, or some other type of turbine, including even a pump.

Figure 7:
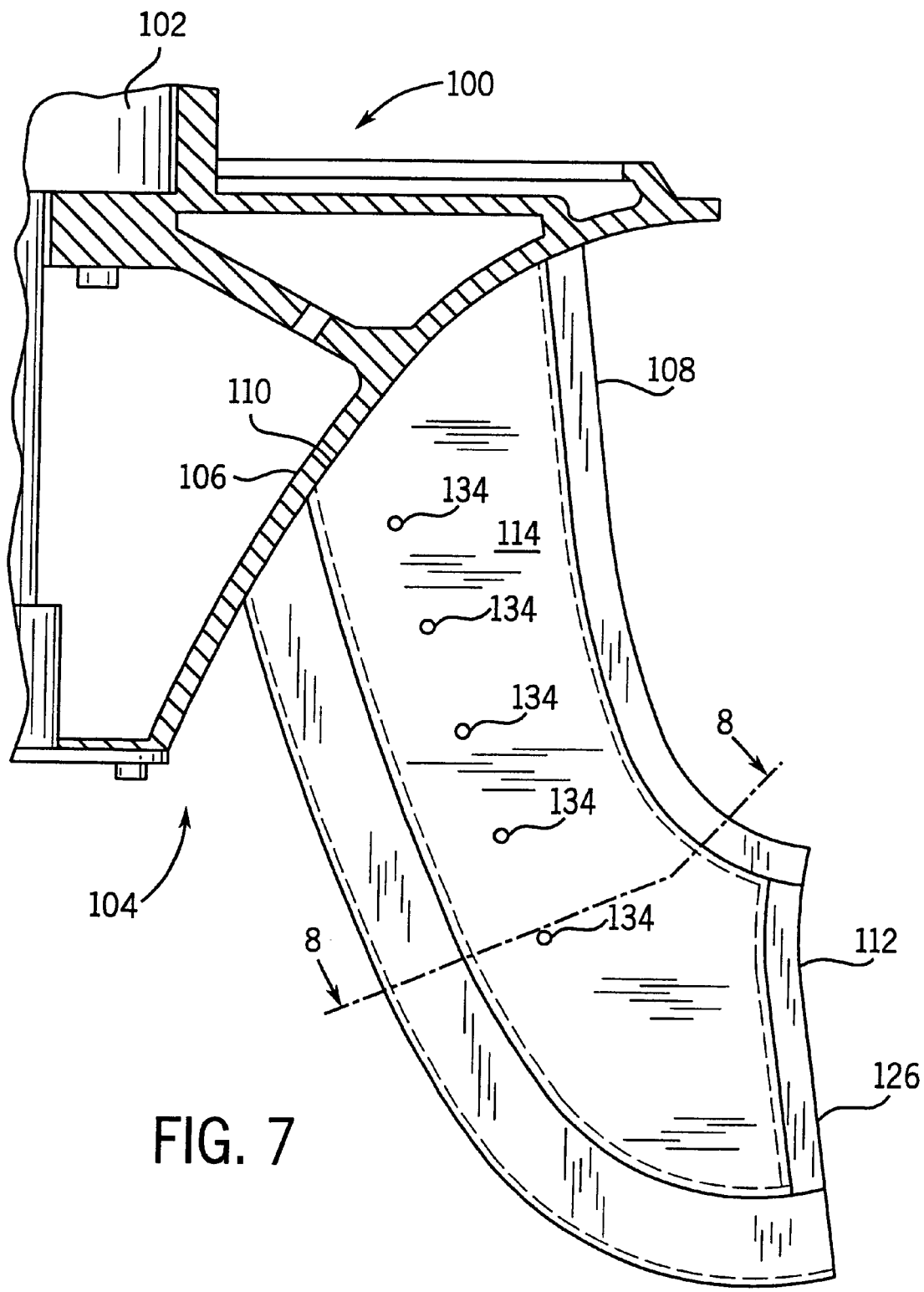
FIG. 7 is an elevational view, partially in cross section, of a bandless turbine including another embodiment of a runner of the present invention.

One alternative turbine embodiment is shown FIG. 7, which illustrates a bandless (or mixed-flow) turbine 100 in accordance with the present invention. Turbine 100 includes a shaft 102 and a runner 104 secured thereto for rotation. Runner 104 includes a hollow hub 106 and a plurality of circumferentially spaced, generally radially extending hollow blades 108.

Figure 8:
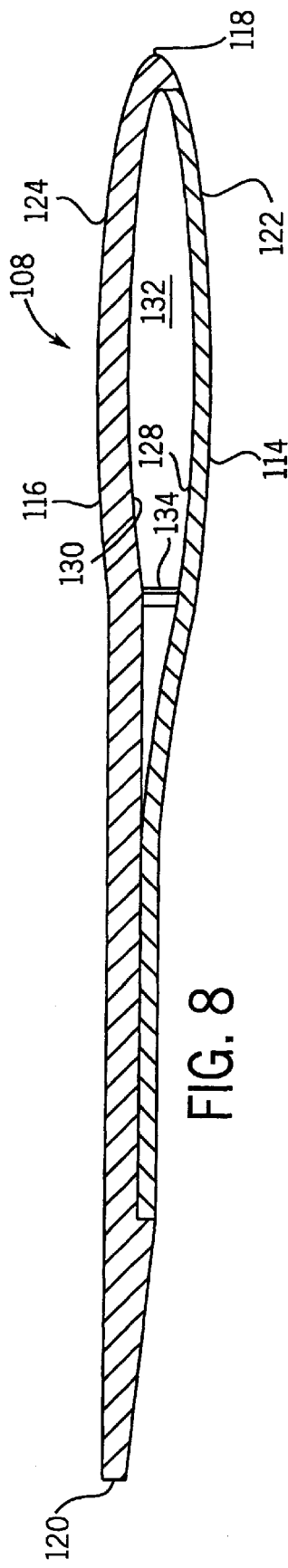
FIG. 8 is a cross-sectional view of the blade of FIG. 7, taken along the line 8—8 in FIG. 7.

Each blade 108 is defined by an inner edge 110 and an opposed distal outer edge 112, a pressure surface 114 and an opposed suction surface 116, and a leading edge 118 and an opposed trailing edge 120. As best shown in FIG. 8, blade 108 comprises a pressure side member 122 and a suction side member 124 secured directly together (i.e., the leading and trailing edge members are omitted). In addition, an outer edge member 126 extends along outer edge 112 of blade 108. Pressure side member 122 has an inner surface 128 including a mid-portion thereof spaced from an inner surface 130 of suction side member 124, thus forming a cavity 132. A plurality of vibration dampeners 134 may be provided in an upper part of blade 108.

Figure 9:
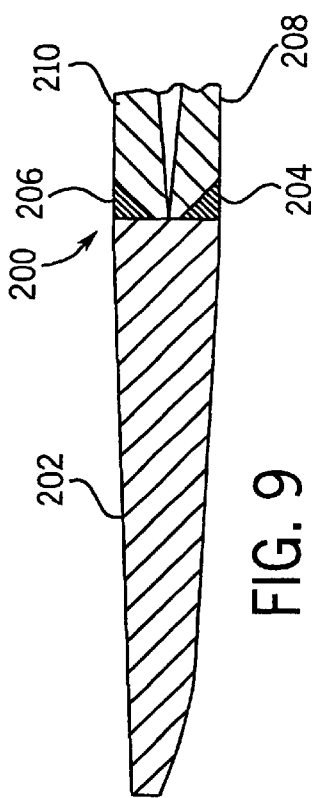
FIG. 9 is a view similar to FIG. 4, but showing an alternative embodiment of a runner blade constructed in accordance with the present invention.

Turning briefly to FIG. 9, an alternative construction for the trailing edge portion of a blade 200 is shown. This embodiment employs a separate trailing edge member 202 fixedly secured to rear edges 204 and 206 of a pressure side member 208 and a suction side member 210, respectively.

Although a variety of embodiments have been particularly described, it should be understood that the above description is of preferred exemplary embodiments of the present invention, and that the invention is not limited to the specific forms described. For example, gas supply and discharge passageway configurations and locations need not be as described herein, e.g., gas discharge openings could be provided in suction-side member 50 to allow discharge of gas from cavity 56 to suction surface 42 of blade 32, rather than (or along with) to trailing edge 46. In addition, although the method of making a hollow blade is described above with reference only to blade 32 (with suction and pressure side plates not in direct contact), the method of making a hollow blade such as blade 108 or 200 (with suction and pressure side plates secured directly together) will be clear to one skilled in the art from that description. Such other constructions are, therefore, considered to be within the scope of this invention. Accordingly, these and other substitutions, modifications, changes and omissions may be made in the design and arrangement of the elements and in their method of operation as disclosed herein without departing from the scope of the appended claims.

What is claimed is:

1. A method of fabricating a blade for a hydraulic turbine or pump, the blade including a pressure surface and an oppositely facing suction surface, a leading edge and a spaced apart trailing edge, and an inner edge and a distal outer edge, each of the pressure and suction surfaces having a three-dimensional curvature extending from the inner edge to the outer edge to provide the blade with a curved hydrofoil shape, the method comprising:

pressing a first generally flat plate into a curved pressure-side member including at least a substantial portion of the curved pressure surface and an opposed first inner surface, the curved pressure-side member having a three-dimensional twisted curvature extending from the inner edge to the outer edge of the blade;

pressing a second generally flat plate into a curved suction-side member including at least a substantial portion of the curved suction surface and an opposed second inner surface, the curved suction-side member having a complementary three-dimensional twisted curvature extending from the inner edge to the outer edge of the blade; and fixedly securing the curved pressure-side and suction-side members together with the first and second inner surfaces facing each other to provide the blade with the curved hydrofoil shape.

2. The method of claim 1, wherein each of the curved pressure-side and suction-side members includes a generally flat portion adjacent the inner edge and a three-dimensionally curved portion adjacent the outer edge.

3. The method of claim 1, wherein at least a portion of the first inner surface is spaced from at least a portion of the second inner surface to form a cavity within the blade.

4. The method of claim 3, wherein each of the curved pressure-side and suction-side members includes a generally flat portion adjacent the inner edge and a three-dimensionally curved portion adjacent the outer edge, and wherein the cavity within the blade is co-extensive with at least a portion of the three-dimensionally curved portions of the curved pressure-side and suction-side members.

5. The method of claim 3, wherein the fixedly securing step includes the step of installing in the cavity at least one vibration dampener extending between the spaced apart inner surfaces.

6. The method of claim 1, further comprising:

shaping a third generally flat plate into a leading edge member having opposed pressure-side and suction-side rear edges and a rounded front end adjacent the leading edge of the blade;

securing a front edge of the pressure-side member to the pressure-side rear edge of the leading edge member; and securing a front edge of the suction-side member to the suction-side rear edge of the leading edge member.

7. A method of fabricating a blade for a hydraulic turbine or pump, the blade including a pressure surface and an oppositely facing suction surface, a leading edge and a spaced apart trailing edge, and an inner edge and a distal outer edge, each of the pressure and suction surfaces having a three-dimensional curvature extending from the inner edge to the outer edge to provide the blade with a curved hydrofoil shape, the method comprising:

shaping a first generally flat plate into a curved pressure-side member including at least a substantial portion of the curved pressure surface and an opposed first inner surface, the curved pressure-side member having a three-dimensional curvature extending from the inner edge to the outer edge of the blade;

shaping a second generally flat plate into a curved suction-side member including at least a substantial portion of the curved suction surface and an opposed second inner surface, the curved suction-side member having a complementary three-dimensional curvature extending from the inner edge to the outer edge of the blade;

fixedly securing the curved pressure-side and suction-side members together with the first and second inner surfaces facing each other to provide the blade with the curved hydrofoil shape;

shaping a third generally flat plate into a trailing edge member having opposed pressure-side and suction-side front edges and a thickness distribution generally decreasing from the front edges toward the trailing edge of the blade;

securing a rear edge of the pressure-side member to the pressure-side front edge of the leading edge member; and securing a rear edge of the suction-side member to the suction-side front edge of the leading edge member.

8. The method of claim 7, wherein the step of shaping the trailing edge member further comprises bending the third plate into a curved shape.

9. The method of claim 7, wherein at least a portion of the first inner surface is spaced from at least a portion of the second inner surface to form a cavity within the blade, and wherein the step of shaping the trailing edge member further comprises forming a plurality of gas discharge passages extending from adjacent the front edges to the trailing edge of the blade, the gas discharge passages being in fluid communication with the cavity.

10. The method of claim 9, where in the step of forming the gas passages comprises forming holes through the third generally flat plate.

11. A runner for a hydraulic turbine or pump, comprising:
a central hub; and
a plurality of fabricated blades radially extending from the hub at spaced intervals therearound, each blade having an inner edge adjacent an outer surface of the hub and a distal outer edge, a leading edge and an opposed trailing edge, and a pressure side and an opposed suction side, each of the blades having a curved hydrofoil shape extending from the inner edge to the outer edge, at least one of the blades comprising:
a curved pressure-side member including at least a substantial portion of the curved pressure surface and an opposed first inner surface, the curved pressure-side member having a three-dimensional twisted curvature extending from the inner edge to the outer edge of the blade; and
a curved suction-side member including at least a substantial portion of the curved suction surface and an opposed second inner surface, the curved suction-side member having a complementary three-dimensional twisted curvature extending from the inner edge to the outer edge of the blade;
wherein the curved pressure-side and suction-side members are fixedly secured together with the first and second inner surfaces facing each other, and wherein at least a portion of the first inner surface is spaced from at least a portion of the second inner surface to provide the at least one of the blades with the curved hydrofoil shape.

12. The runner of claim 11, wherein each of the curved pressure-side and suction-side members includes a generally flat portion adjacent the inner edge and a three-dimensionally curved portion adjacent the outer edge.

13. The runner of claim 11, wherein at least a portion of the first inner surface is spaced from at least a portion of the second inner surface to form a cavity within the blade.

14. The runner of claim 13, wherein each of the curved pressure-side and suction-side members includes a generally flat portion adjacent the inner edge and a three-dimensionally curved portion adjacent the outer edge, and wherein the cavity within the blade is co-extensive with at least a portion of the three-dimensionally curved portions of the curved pressure-side and suction-side members.

15. The runner of claim 13, wherein at least one vibration dampener is fixedly secured in the cavity extending between the spaced apart inner surfaces.

16. The runner of claim 11, wherein the at least one of the blades further comprises:
a leading edge member having opposed pressure-side and suction-side rear edges and a rounded front end adjacent the leading edge of the blade;
wherein a front edge of the pressure-side member is secured to the pressure-side rear edge of the leading edge member, and wherein a front edge of the suction-side member is secured to the suction-side rear edge of the leading edge member.

17. The runner of claim 11, wherein the at least one of the blades further comprises:
a trailing edge member having opposed pressure-side and suction-side front edges and a thickness distribution generally decreasing from the front edges toward the trailing edge of the blade;
wherein a rear edge of the pressure-side member is secured to the pressure-side front edge of the trailing edge member, and wherein a rear edge of the suction-side member is secured to the suction-side front edge of the trailing edge member.

18. The runner of claim 17, wherein at least a portion of the first inner surface is spaced from at least a portion of the second inner surface to form a cavity within the blade, the trailing edge member including a plurality of gas discharge passages extend therethrough from adjacent the front edges thereof to the trailing edge of the blade, the gas discharge passages being in fluid communication with the cavity.

19. A fabricated hollow blade for a hydraulic turbine or pump, the blade including an inner edge and an opposed outer edge, a leading edge and an opposed trailing edge, and a curved suction surface and an opposed curved pressure surface, each of the pressure and suction surfaces having a three-dimensional curvature extending from the inner edge to the outer edge to provide the blade with a curved hydrofoil shape, the blade comprising:
a curved pressure-side member including at least a substantial portion of the curved pressure surface and an opposed first inner surface, the curved pressure-side member having a three-dimensional twisted curvature extending from the inner edge to the outer edge of the blade; and
a curved suction-side member including at least a substantial portion of the curved suction surface and an opposed second inner surface, the curved suction-side member having a complementary three-dimensional twisted curvature extending from the inner edge to the outer edge of the blade;
wherein the curved pressure-side and suction-side members are fixedly secured together with the first and second inner surfaces facing each other to provide the blade with the curved hydrofoil shape.

20. The blade of claim 19, wherein at least a portion of the first inner surface is spaced from at least a portion of the second inner surface to form a cavity within the blade.

* * * * *